US012668387B2

(12) United States Patent　　(10) Patent No.: US 12,668,387 B2

Van Den Brink　　(45) Date of Patent: Jun. 30, 2026

(54) EGG TRANSFER ASSEMBLY, EGG TRANSFER SYSTEM AND EGG PROCESSING SYSTEM

(71) Applicant: Moba Group B.V., Barneveld (NL)

(72) Inventor: Hendrik Van Den Brink, Kootwijkerbroek (NL)

(73) Assignee: MOBA GROUP B.V., Barneveld (NL)

( * ) Notice: Subject to any disclaimer, the term of this patent is extended or adjusted under 35 U.S.C. 154(b) by 59 days.

(21) Appl. No.: 18/859,294

(22) PCT Filed: May 23, 2023

(86) PCT No.: PCT/NL2023/050295

§ 371 (c)(1),
　(2) Date: Oct. 23, 2024

(87) PCT Pub. No.: WO2023/229460

PCT Pub. Date: Nov. 30, 2023

(65) Prior Publication Data

US 2025/0282511 A1　　Sep. 11, 2025

(30) Foreign Application Priority Data

May 24, 2022　(NL) ..................................... 2031972

(51) Int. Cl.
　*B65B 23/08*　　(2006.01)
　*B65B 35/36*　　(2006.01)
　(Continued)

(52) U.S. Cl.
　CPC .............. *B65B 23/08* (2013.01); *B65B 35/36* (2013.01); *B65G 11/123* (2013.01);
　(Continued)

(58) Field of Classification Search
　CPC ...... B65G 47/52; B65G 11/123; B65G 17/32; B65G 17/323; B65G 47/842; B65G 2201/0208; B65B 23/08; B65B 35/36
　See application file for complete search history.

(56) References Cited

U.S. PATENT DOCUMENTS 4,015,704 A * 4/1977 Warren ................ B65G 17/323
　　　　　　　　　　　　　　　　　198/803.14
4,068,882 A * 1/1978 van der Schoot ...... B65B 23/08
　　　　　　　　　　　　　　　　　294/116
(Continued)

FOREIGN PATENT DOCUMENTS

CN　　111846352　　10/2020
EP　　　0819920　　1/1998
(Continued)

OTHER PUBLICATIONS

International Search Report for PCT/NL2023/050295 dated Aug. 2, 2023.

*Primary Examiner* — James R Bidwell

(74) *Attorney, Agent, or Firm* — Stephen J. Weyer, Esq.; Stites & Harbison, PLLC

(57)　　　　ABSTRACT

Egg transfer assembly, including two elongated parallel carrier elements, the two carrier elements having arrays of nest sections, pairs of opposite nest sections defining egg receiving nests therebetween, wherein each nest section is swivably connected to the respective carrier element, in particular for providing an array of swivable egg receiving nests and preferably for providing an array of at least locally expandable egg receiving nests. Also, the invention provides an egg transfer system, for example part of an egg sorting system and/or egg packaging system, including a row of the egg transfer assemblies. Further, the invention provides an egg processing system, including at least one egg supply conveyor for supplying eggs along a transport direction S, as (Continued)

well as at least one of the egg transfer systems for receiving eggs from the egg supply conveyor.

19 Claims, 8 Drawing Sheets

(51) Int. Cl.
    *B65G 11/12*         (2006.01)
    *B65G 17/32*         (2006.01)
    *B65G 47/52*         (2006.01)
    *B65G 47/86*         (2006.01)

(52) U.S. Cl.
    CPC ........... *B65G 17/323* (2013.01); *B65G 47/52* (2013.01); *B65G 47/842* (2013.01); *B65G 2201/0208* (2013.01)

(56) References Cited

U.S. PATENT DOCUMENTS

| | | | | |
|---|---|---|---|---|
| 4,488,637 A | * | 12/1984 | Loeffler | .............. B65G 47/842 198/803.9 |
| 4,863,008 A | * | 9/1989 | Doi | ......................... B65B 23/06 198/418.6 |
| 5,232,080 A | | 8/1993 | Van Essen et al. | |
| 2006/0037840 A1 | | 2/2006 | Van De Hazel et al. | |

FOREIGN PATENT DOCUMENTS

| | | | | |
|---|---|---|---|---|
| EP | 2 174 896 | 4/2010 | | |
| EP | 2 842 877 | 3/2015 | | |
| GB | 1463977 A | * | 2/1977 | ............. B65B 23/08 |
| JP | H09150941 | 6/1997 | | |
| JP | H11278428 | 10/1999 | | |
| JP | 2015151229 | 8/2015 | | |
| WO | WO-2016118004 A1 | * | 7/2016 | ............. B65G 47/54 |

* cited by examiner

PRIOR ART

PRIOR ART

Fig. 8

EGG TRANSFER ASSEMBLY, EGG TRANSFER SYSTEM AND EGG PROCESSING SYSTEM

The present invention relates to an egg transfer assembly, including two elongated parallel carrier elements, the two carrier elements having arrays of nest sections, pairs of opposite nest sections defining egg receiving nests therebetween. The invention also provides an egg transfer system and an egg processing system.

It is generally known, for instance from EP 560458, that the eggs can be conveyed with grippers and upon sorting are discharged at certain locations. These locations are e.g. situated above packaging devices which generally run in a certain direction following under the sorting apparatus, usually a direction that differs from an egg supply direction. In order to arrange for proper guidance upon transfer of the eggs, transferring units can be positioned between the egg supplying sorting conveyor and e.g. the packaging devices, thus functioning as intermediate station and egg transfer guide.

JPH11278428A discloses pairs of long swingable arms having holders at their ends for receiving eggs, the arms being pivotably connected to a support frame in a state that the holders are swingable in such a manner as to approximate to a parabolic path of an egg released a single line conveyor. The arms are configured for catching the eggs at a vertical level above a support frame. During egg catching, the arms move/swing downwardly towards the support frame, that is conveyed by a chain. In order to pack the chicken eggs from the holders into a container, eggs are sucked up by suction cups arranged in a matrix. Alternatively, the holder is divided, and one set of the divided holder and the swing arm has a cantilever shaft configuration, and the distance between the opposing constituent pieces can be slid outward to the outside. The eggs may be dropped from between the two constituent pieces slid to, and the intervals between the eggs may be adjusted in the next step, and then the eggs may be packed in a container. The system known from JP'428, however, is rather bulky, difficult to clean and prone to contamination, and is not capable of achieving desired high operating speeds.

US2006/037840 discloses an egg transfer assembly, also called conveying unit, as part of an apparatus for transferring products, in particular eggs. In particular, the known apparatus comprises a number of rows of such transfer assemblies, at a certain height below an endless sorting conveyor. Each transfer assembly is provided with adjoining pairs of first and a second nest defining elements that can move relative to each other, in particular away from each other and back again, from an egg receiving position (wherein the elements define nests) for taking up an egg to an egg discharge position for delivering (dropping) the egg downwardly therefrom. During operation the eggs are discharged in a well-defined manner from the sorting conveyor into conveying units, are received by the conveying units, and are subsequently delivered to e.g. a packaging device thereunder. In this known apparatus, each of the transferring assemblies include two parallel shafts that are fitted with (i.e. fixed to) the pairs of opposite nest defining elements. The shafts can be swiveled (about their center lines) for adjusting the positions of the nest defining elements between their egg receiving positions and their egg discharging positions.

EP2842877 relates to an egg conveying apparatus, wherein a transfer portion includes a pitch converting portion configured to receive "n" eggs from a first conveying portion.

EP2174896 provides an egg transfer apparatus wherein a bucket group functions in response to an opening/closing mechanism of an acceleration-ejection unit.

EP0819920 discloses a method and apparatus for selecting eggs.

The egg transfer assembly, respective egg transfer system and egg processing system known from US'840 are durable and can provide reliable, hygienic operation for long operational time periods, however, further improvement is desired. In particular, an aim of the present invention is to provide an egg transfer assembly that can achieve higher throughput without increasing chances of damaging/breaking the eggs that are transferred. Also, the invention aims at providing a compact transfer assembly (as well as a respective compact egg transfer system and compact egg processing system) that is or remains sufficiently resistant to contamination and dirt at a high throughput, and provides reliable operation.

Advantageously, there is provided an egg transfer assembly, including two elongated parallel (rotatable) carrier elements, the two carrier elements having arrays of nest sections (e.g. respective nest defining elements, bodies, structures, walls or wall sections), pairs of opposite nest sections defining egg receiving nests therebetween. Each nest section is swivably connected to the respective carrier element (via a respective pivot axis), in particular for providing an array of swivable egg receiving nests and preferably for providing an array of at least locally expandable egg receiving nests.

In this way, above-mentioned objects can be achieved, wherein the assembly can provide relatively higher throughputs without increasing chances of damaging/breaking the eggs that are transferred. Also, the resulting transfer assembly can be made compact and can be sufficiently resistant to contamination and dirt at a high throughput.

In particular, it has been found that pairs of swivable nest sections (i.e. being swivably connected to the two parallel, rotatable, carrier elements, providing swivable egg receiving nests) can receive the eggs and subsequently swivel to a certain degree (e.g. from an upward position downwardly) towards respective egg holding positions. This allows for relatively high egg processing speeds, in particular in case eggs are dropped towards the nest sections from an egg release direction that is substantially parallel to the respective carrier elements. Preferably, each pair of opposite nest sections can have an initially slanted orientation with respect to a vertical center line, for receiving an egg that is being dropped into that nest. The pair of opposite nest sections is then preferably configured to automatically move to a second, non-slanted (upright) orientation or less-slanted orientation for holding the received egg in its nest. Subsequently, e.g. after all the nests have been filled with eggs, the respective carriers can be operated (i.e. rotated) for opening the nests so that the eggs can be dropped c.q. transferred to a subsequent egg processing apparatus (that can extend below the transfer assembly).

In this way, chances of bumping of eggs together at the egg receiving nests (which can result in egg damage) can be significantly reduced, even at relatively high processing speeds.

Automatic movement/swiveling of each pair of nest sections with respect to the two carrier elements can e.g. be gravity effected movement (due to the weight of the received egg) and egg kinetic energy effective movement, and is preferably counteracted by suitable spring means to allow a controlled deceleration of the nest and egg (to a stationary state with respect to the two respective carrier element).

During operation, in particular during egg transfer/movement towards the transfer assembly, each egg preferably has a substantially vertical orientation (with its long axis extending vertically) as will be clear to the skilled person. Alternatively, during egg transfer towards the assembly, the egg may have a slanted orientation, wherein its long axis includes an angle with a vertical plane, for example an angle in the range of about 1 to 15 degrees.

According to a preferred embodiment, each pair of nest sections is movable, with respect to the two elongated parallel carrier elements, from a first orientation (i.e. a first position) for receiving an egg, falling towards that pair of nest sections, to a second orientation (i.e. a second position) for carrying a received egg in the respective egg receiving nest, the first orientation in particularly being a slanted orientation with respect to a vertical plane and the second orientation in particular being in parallel with respect to the vertical plane or being a less-slanted orientation than said first orientation. In particular, the second orientation is an orientation wherein the respective pair of nest sections defines an egg carrying nest.

For example, the configuration can be such that each pair of nest sections is located at a first (close) distance from each other along at least part of opposite edges of those sections when they are in said first orientation. For example, the two egg receiving sections contact each other along at least part of opposite edges of those sections when they are in said first orientation. Then, preferably, each pair of nest sections is spaced-apart at a second distance that is larger than said first distance when they are in said second orientation, to locally expand the respective nest (i.e. to increase a volume of at least part of the nest). In other words, the two nest sections can be pivotally (i.e. swivably) connected in such a way to their carrier elements that the respective egg receiving nest (slightly) expands locally (e.g. at a bottom part of the nest) due to the two nest sections moving from their first (initial, egg receiving/catching position) to their second (egg holding) position. This can further improve egg catching capabilities of the nest sections at relatively high processing speeds (without damaging the eggs), preferably at relatively small movements of the nest sections. Similarly, the configuration of the transfer assembly is preferably such that each respective egg receiving nest (slightly) contracts—at least locally—back to an initial state (i.e. the two egg receiving sections moving towards each other) when the respective two nest sections move back from said second position to said first position.

Moreover, it is preferred that top parts of each pair of nest sections move towards each other when the nest sections move from the first orientation to the second orientation, wherein bottom parts of each pair of nest sections preferably move away from each other when the nest sections move from the first orientation to the second orientation. This can provide the above-mentioned advantages and can further improve egg precise catching and controlled egg deceleration.

Also, as is mentioned before, a spring means can be provided for counteracting the movement of each of the nest sections (i.e. movement with respect to the two parallel carrier elements carrying/holding the nest sections). It is preferred that relatively strong spring means are selected c.q. spring means that are configured to be relatively insensitive to contamination, to durably provide the same spring force to each of the two nest sections of a pair of nest sections during operation. Instead of spring means, a counter-balancing mass can be applied to each of the nest sections to provide a biasing force towards its respective first position.

According to a preferred embodiment, each nest section has a concave inner side and an outer side, and a first connector structure protruding outwardly from said outer side for swivably connecting the nest section to a second connector structure of a respective elongated carrier element, each first connector structure and respective second connector structure in particular being connected by a respective pivot axis. Further, the carrier elements are preferably rotatably in opposite directions for opening and closing the egg receiving nests defined by the pairs of nest sections.

According to a further aspect of the present disclosure there is provided an egg transfer system, for example being part of an egg sorting system and/or egg packaging system, the egg transfer system including at least one row of egg transfer assemblies according to the invention. In this way, above-mentioned advantages can be achieved in transferring a relatively large number of eggs. In particular, the row of egg transfer assemblies can provide an array of such assemblies, extending in parallel, at the same or substantially the same horizontal level, the assemblies for example being connected or held in a frame or similar support structure (and e.g. forming a "receiverset"), for catching and transferring a large number of eggs.

According to a further aspect of the present disclosure there is provided an egg processing system, including at least one egg supply conveyor for supplying eggs along a transport direction S, as well as at least one afore-mentioned egg transfer system for receiving eggs from the egg supply conveyor, wherein the elongated parallel carrier elements of the egg transfer system preferably extend substantially in parallel with respect of the transport direction of the egg supply conveyor.

In this way above-mentioned advantages are provided in the egg processing system.

Further advantageous embodiments are described in the dependent claims. The invention will now be explained in more detail with reference to the drawings, which show non-limiting examples. In the drawings, similar or corresponding features are denoted by similar or corresponding reference signs.

FIG. 8 is a perspective view of the second advantageous embodiment, during operation when the egg transfer assembly is receiving an egg.

Figure 1:
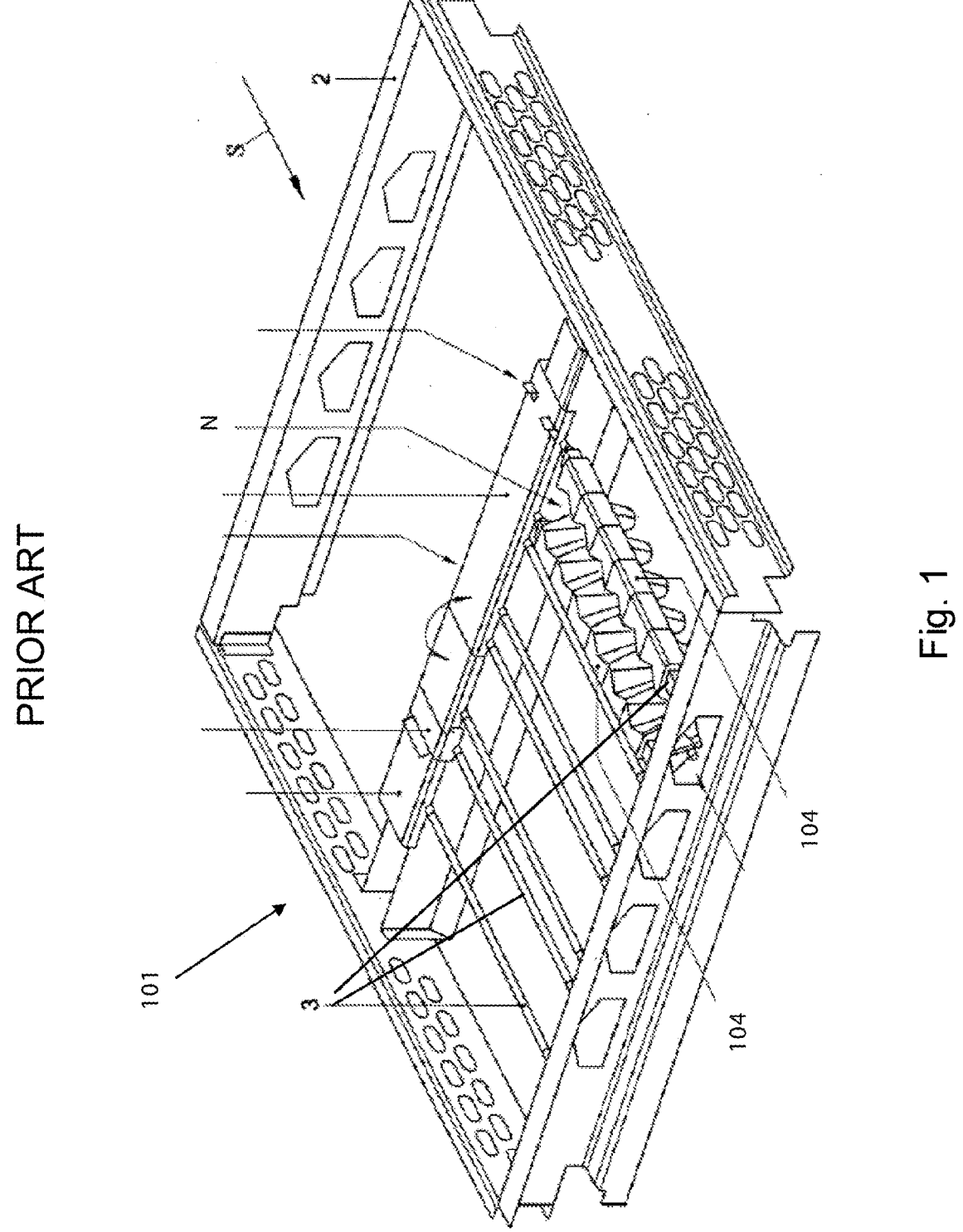
FIG. 1 depicts a perspective view of a known egg transfer system.
Figure 2:
FIG. 2 shows part of the system of FIG. 1, during operation.

FIG. 1 schematically shows, in an isometric view taken obliquely from above, a known egg transfer system 101, i.e. transfer unit/apparatus (see e.g. US2006/037840). The transfer system 101 can be part of an egg sorting system and/or egg packaging system, and includes a number of rows of egg transfer assemblies 103, 104 (one assembly 103, 104 being show in full). FIG. 2 shows part of the system during operation, i.e. during an egg transfer assembly 103, 104 receiving an egg E.

Each of the egg transfer assemblies has two elongated parallel (rotatable) carrier elements (e.g. shafts or rods) 103, the two carrier elements having arrays of nest sections 104. Pairs of opposite nest sections 104 define corresponding egg receiving nests N therebetween. A said nest section 104 can e.g. be or be called a nest element, a nest body or body section, a nest structure, nest wall, or the-like. Each nest section 104 can e.g. have a concave inner side and a convex outer side (faced away from the inner side). In the known assembly, the nest defining sections 104 have fixed positions with respect to their carrier elements 103 (i.e. they are unmovably connected to/joined with those elements 103).

The egg transfer system 101 can e.g. include a frame 2 or similar support structure, for holding the rows of transfer assemblies 103, 104. Preferably, all carrier elements 103 extend in parallel, at the same horizontal level, i.e. holding the respective receiving nests at the same horizontal position. Also, according to an embodiment, the frame 2 of the system can be stationary during operation, i.e. during receiving eggs from above (from an egg supply conveyor 20) and/or during dropping received eggs to a subsequent processing station (not shown), and/or during a time period between the receiving and releasing of the eggs. An egg supply direction, provided by the supply conveyor 20, is indicated by arrow S in the drawings.

The egg transfer system 101 can e.g. form part of an egg sorting machine which is generally considered to comprise a sorting conveyor 20 (or similar egg supply conveyor) and a number of downstream packaging devices (not shown), and one or more of transfer systems 101 for transferring eggs from the sorting conveyor 20 (extending there-above) to packaging devices (extending there-below).

The transfer system 101 can form a so-called receiverset for receiving discharged eggs E from the sorting conveyor 20 and transferring the eggs downwardly from this receiverset to, for instance, a bufferset or other egg processing station (not shown).

Optionally, the carriers 103 of each of the egg transfer assemblies 103, 104 can be releasably connected to the respective frame (for example following the teachings of US2006/037840). Besides, the carriers 103 of the egg transfer assemblies are preferably (synchronously) rotatable or swivable with respect to their support structure 2, about respective (horizontal, parallel) center lines L (i.e. respective axes of rotation), for opening and closing the respective nests (allowing release of the eggs E therefrom), as will be clear to the skilled person. That is, each of the carriers 103 can be pivotally held by or coupled to the respective frame 2 of the transfer system 101. A direction of rotation for opening the nests, by rotating the two carriers 103, is indicated by arrows R1, R2. Means for actuating the carriers (to rotate the carriers 103 between egg receiving positions and egg discharge positions), such as drive means, a motor, cam engagement means or the-like, are not depicted in FIG. 1, and are known per se to the skilled person.

FIG. 2 shows operation of the system, at a relatively high processing speed. Due to the high processing speed, a dropped egg (i.e. dropped by an above egg supply conveyor 20) may reach an egg receiving nest of the transfer system 101 at a relatively high horizontal speed such that it bounces onto an egg—at a contact point K—that has already been received in the adjoining nest. Such a bounce may lead to damage to the eggs E. The following embodiments provide a solution to this problem.

Figure 3:
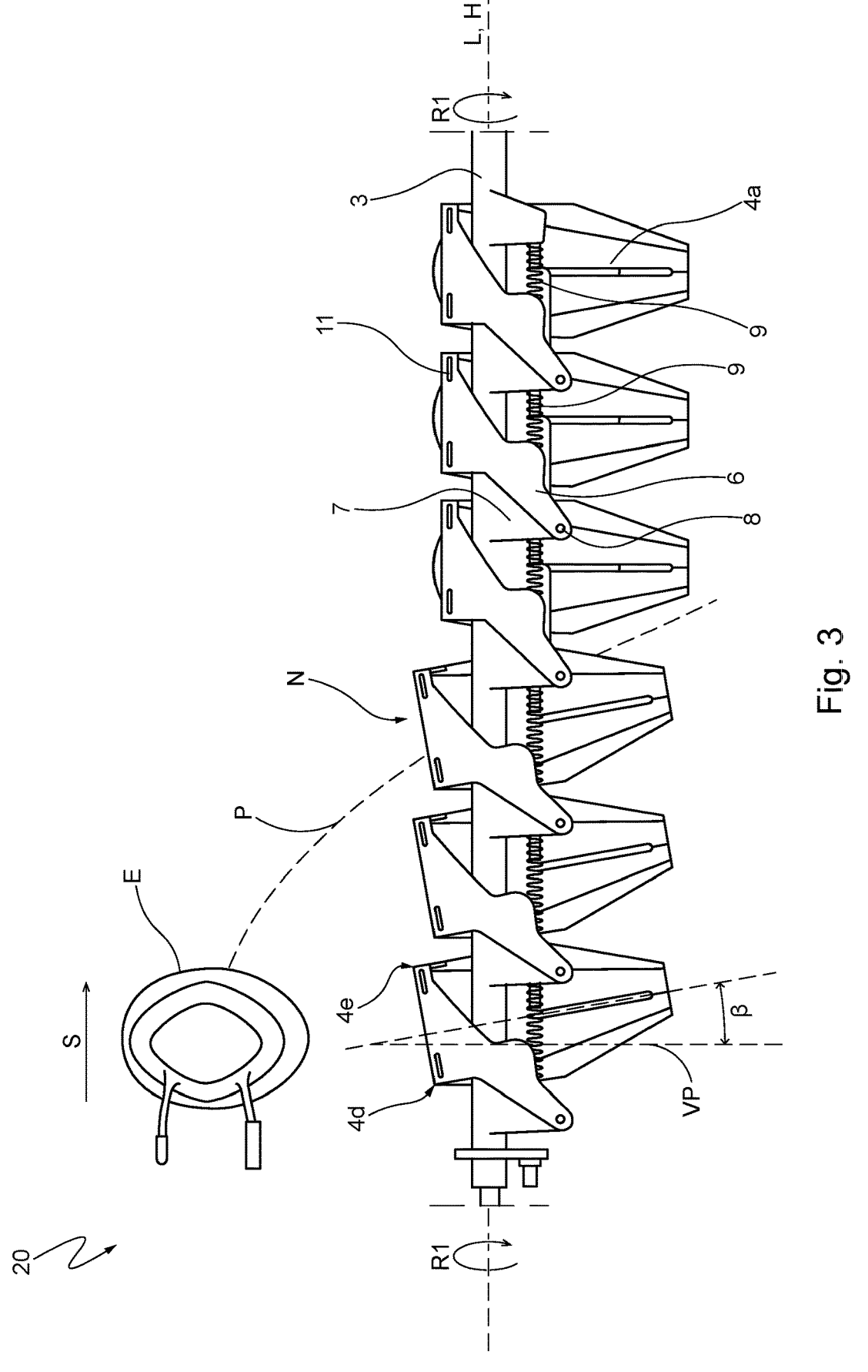
FIG. 3 shows a side view of a first advantageous embodiment of a an egg transfer assembly.
Figure 4:
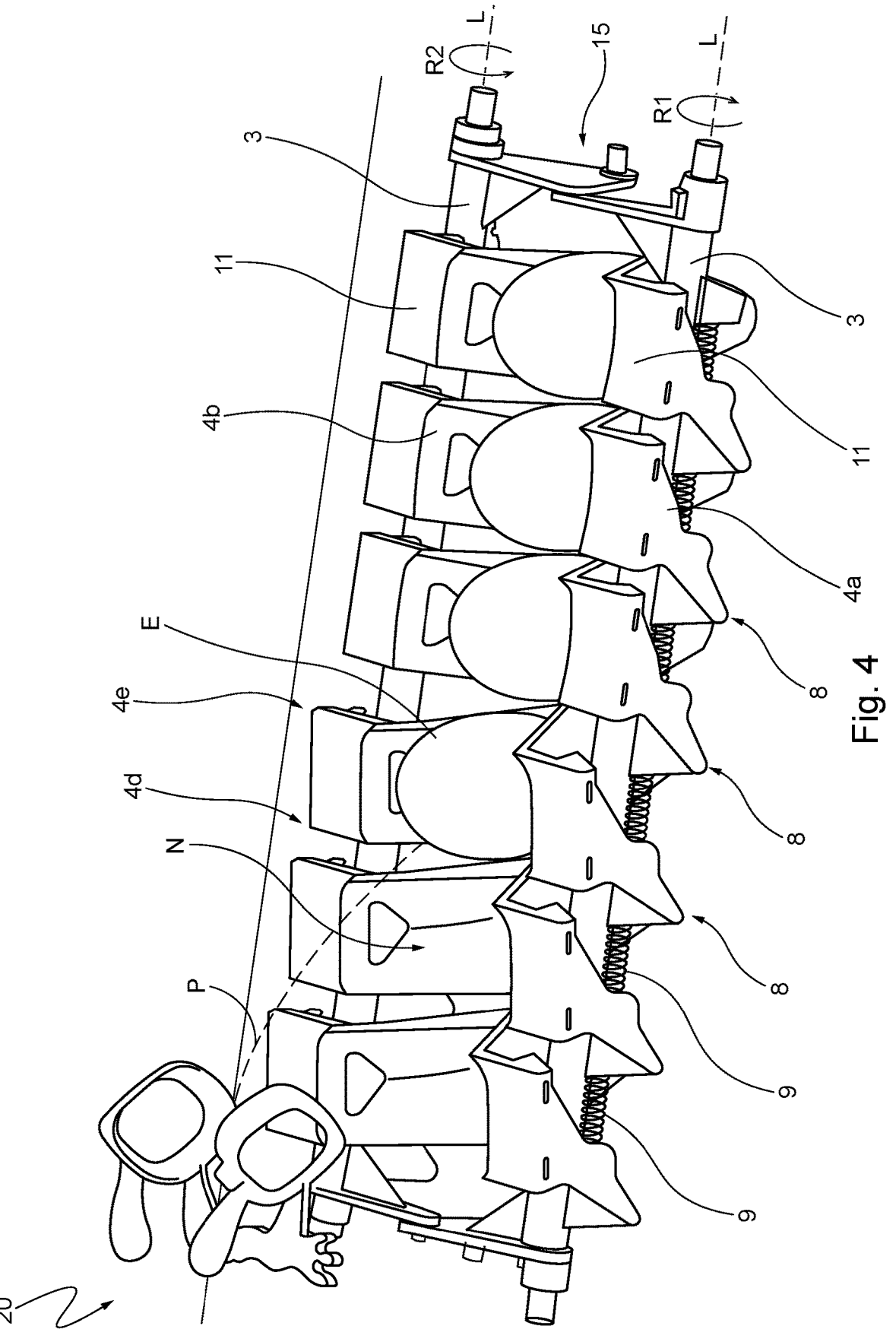
FIG. 4 is a perspective view of the example shown in FIG. 3, during the receiving of an egg.

FIGS. 3-4 show an example of an egg transfer assembly 3, 4a, 4b, that can e.g. be part of an abovementioned egg transfer system 101 (for example instead of the above-described transfer assembly 103, 104). As in the known egg transfer assembly, the present innovative egg transfer assembly includes (only) two elongated parallel carrier elements 3, the two carrier elements having arrays of nest sections (element, body, structure, wall), pairs of opposite nest sections defining egg receiving nests therebetween.

It is preferred that the two nest sections 4a, 4b are mirror-symmetrical structures, in particular viewed with respect to a central vertical mirror plane that centrally intersects the nests N and extends in parallel with the two carrier elements 3.

In the present case, advantageously, each nest section 4a, 4b is swivably connected to the respective rotatable carrier element 3. For example, the nest sections 4a, 4b are swivably for providing an array of swivable egg receiving nests N. According to a further embodiment (described below regarding FIGS. 5, 6) they can be configured to provide an array of at least locally expandable egg receiving nests N.

As is mentioned before, each of the carriers 3 as such can be pivotally held by or coupled to the respective frame 2 of the transfer system 101 (the direction of rotation being indicated by arrows R), for opening the nests N to drop received eggs E towards a further processing station. It follows that the two carrier elements are rotatably in opposite directions R1, R2 for opening and closing the egg receiving nests N defined by the pairs of nest sections 4a, 4b. The two carrier elements 3 can e.g. be interconnected by an actuating mechanism 15 for jointly rotating the elements 3 in said opposite directions R1, R2 in order to simultaneously open and close the array of nests N provided between the respective nest defining sections 4a, 4b.

Each nest section 4a, 4b can have a concave inner side and a (convex) outer side. A first connector structure 6 protruding outwardly from said outer side of each nest section 4a, 4b can be provided, for swivably connecting the nest section to a second connector structure 7 of a respective elongated carrier element 3. Each first connector structure 6 and respective second connector structure 7 can be connected by a respective pivot axis 8. According to an example, each pivot axis 8, pivotally (i.e. swivably) connecting a nest section 4a, 4b to a respective carrier element 3, extends in a horizontal direction (wherein all of these pivot axes extend in parallel with each other, and normally with respect to the center lines L of the carrier elements 3). Preferably, the pivot axes 8 of the first connector structures 7 are located at a vertical level below the center lines L of the carrier elements 3. For example, the second connector structures 7 can reach downwardly from the respective carrier elements 3, to provide lowered pivot points. Preferably top edges 4d, 4e of the respective nests can be at a vertical level above the carrier elements 3 (and first connector structures 6 reaching along those carrier elements 3 when seen in side view, between those vertical levels). Thus, a compact, relatively durable and reliable structure can be achieved.

The skilled person will appreciate that said connector structures 6, 7 can be achieved in various ways, including various pivot connections, for example including arms, notches or cams that swivably interconnect with each other.

Also, as follows from the drawings, in particular, the axes of rotation of the carrier elements 3 do not coincide with the pivot axes 8 of the respective nest sections 4a, 4b. In the present embodiment, the axes of rotation of the carrier elements 3 extend substantially normally with respect to the pivot axes 8 of the respective nest sections 4a, 4b. In another embodiment (see below, and FIGS. 5-8), the pivot axes 8 of the respective nest sections 4a, 4b are slanted with respect to the axes of rotation of the carrier elements 3.

As follows from the drawings, each pair of nest sections 4a, 4b is preferably movable, with respect to the two elongated parallel carrier elements 3, from a first orientation for receiving an egg E, being dropped and falling towards that pair of nest sections 4a, 4b, to a second orientation for carrying a received egg E in the respective egg receiving nest N. The first orientation in particularly is a slanted orientation with respect to a vertical plane VP and the second orientation in particular is in parallel with respect to the vertical plane VP (the vertical plane VP extending normally with respect to the center lines of the two carrier elements 3 of the transfer assembly). As is indicated in FIG. 3, a center line of each nest N in its slanted position can e.g. include an angle ß larger than 1 degree with the vertical plane VP, for example an angle in the range of 1-30 degrees. Preferably, the nest sections 4a, 4b reach along the carrier elements 3 at each position/orientation of the nest sections 4a, 4b with respect to the carrier element 3 (i.e. both the first and section orientation), when viewed in side view.

It is preferred that each nest section 4a, 4b is associated with respective spring means 9 for counteracting the movement of the nest section with respect to the carrier element 3. Such spring means can include an elastic element, a torsion spring, leaf spring, helical spring, a magnetic spring and/or a different type of spring means as will be clear to the skilled person. In particular, such spring means 9 can provide a biasing spring force between the carrier element 3 and the respective nest section 4a, 4b for biasing the nest section into its first (upward/slanted) position, wherein the spring force allows the nest section 4a, 4b to move to its second position (due to gravity, i.e. egg weight) once the respective nest N receives an egg E.

Optionally, each nest section 4a, 4b includes a support member 11 (for example a flange or end stop), extending sideways, and above a top surface of the respective carrier element 3. For example, the support members 11 can be spaced apart from the carrier element 3 when the respective pair of nest sections 4a, 4b are in their first positions, wherein the support members 11 can be supported onto (i.e. mechanically contact) the uppers surfaces of the carrier elements 3 when the respective pair of nest sections 4a, 4b are in second positions.

During operation, eggs E are supplied (at a vertical level above the level of the transfer assembly 3, 4) by e.g. a supply conveyor. In FIGS. 3, 4, the depicted part of the supply conveyor 20 includes a gripper, however, different types of supply conveyors can be implemented. Before an egg E is received in a nest N of the transfer assembly 3, 4, the nest N is in its first slanted (and slightly upward) orientation with respect to the two carrier elements 3. After the egg E is released, it follows a downward path P towards the slanted nest N (the release of the egg E being timed such that the path P enters the nest N, as will be clear to the skilled person). In particular, viewed along an egg transport direction S (of the supply conveyor), the nest N can be slanted such that an upstream top edge 4d of the nest (i.e. its respective nest sections 4a, 4b) is lower than a downstream top edge 4e of the nest (i.e. the nest sections 4a, 4b).

Once an egg E is received in a nest N, the respective pair of nest sections 4a, 4b (synchronously, simultaneously) pivot over their pivot axes 8 to their second (egg carrying) positions, in particular such that the nest N obtains a non-slanted (vertical) orientation and for example such that the top edges 4d, 4e are at the same vertical level.

After a number or all nests N of the transfer assembly 3, 4 has been filled with eggs E, in the above-described manner, the nests N can be opened at a suitable discharge time for dropping all the eggs E at once, by rotating the carrier elements 3 in said opposite directions R1, R2. The opening of nests N in particular includes moving the respective nest sections 4a, 4b to respective third orientations (wherein they do not define an egg carrying nest anymore). After the eggs E have been released, the spring means 9 can force the respective nest sections 4a, 4b back to their initial slanted positions with respect to the two carrier elements 3, and the carrier elements 3 can be rotated back to their initial positions for closing the emptied nests N.

FIGS. 5-8 show a second advantageous embodiment of the transfer assembly, that is significantly improved compared to the example of FIGS. 3, 4. According to one aspect the second embodiment differs from that example in that the nest sections 4a', 4b' are connected to the carrier elements 3 via non-horizontal pivot axes 8a, 8b. In FIGS. 5A, 5B, 5C, one pair of the nest sections 4a', 4b' is shown in a first position/orientation (with respect to the carriers 3), and in FIGS. 6A, 6B, 6C, the same pair of the nest sections 4a', 4b' is shown in their second positions (with respect to their carriers 3'). As in the earlier example, each nest section 4a', 4b' is associated with respective spring means 9' for counteracting the movement of the nest section with respect to the carrier element 3. It is preferred that two spring means 9' are applied for the two respective nest sections 4a', 4b', and that the two spring means 9' are identical. In this way, the spring means 9' can provide reliable, stable spring action, leading to synced nest section movements during egg catching. Also, the slanted orientations of the pivot axes 8a, 8b can improve reliability of the transfer assembly since the respective pivots are less susceptical to wear.

For example, each nest section 4a', 4b' can include a first connector structure 6' protruding outwardly, for swivably connecting the nest section to a connector structure 7' of a respective elongated carrier element 3'. Also, the pivot axes 8a, 8b can be located at a vertical level below the center lines L of the carrier elements 3'. For example, the respective second connector structures 7' can reach downwardly from the respective carrier elements 3', to provide lowered pivot points. Preferably top edges of the respective nests can be at a vertical level above the carrier elements 3'. Besides, preferably, respective first connector structures 6' can be located at a relatively low level as well, e.g. below the carrier elements 3').

Advantageously, each said pivot axis 8a, 8b extends along a respective virtual line (shown with dashed lines) that intersects a horizontal plane H (the horizontal plane H being defined by center lines L of the two carrier elements 3).

Figures 5A, 5B, 5C:
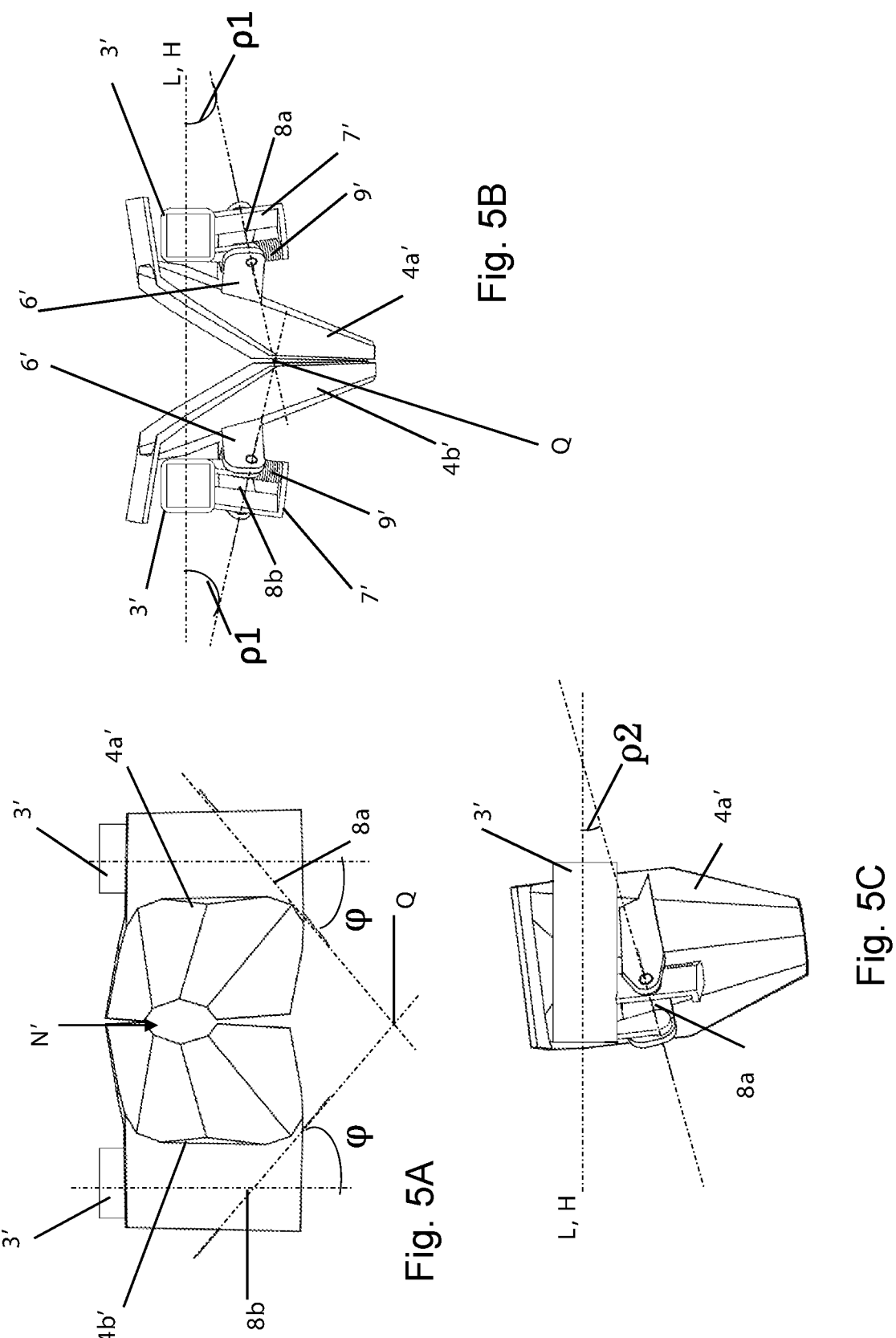
FIGS. 5A, 5B and 5C show a top view, front view and side view of part of a second advantageous embodiment of part of the egg transfer assembly, when the egg receiving nest is in a first, egg receiving, orientation.

Also, according to another aspect the second embodiment, when viewed in a top view (see FIG. 5A) the two pivot axes 8a, 8b of each pair of nest sections extend along virtual lines that intersect each other, at a point of intersection Q. The same holds for the pair of nest section viewed in front view (FIG. 5B). The point of intersection Q can e.g. be located in front of upstream sides of the two respective nest sections 4a', 4b' (viewed with respect to an egg dropping/transport direction S). Also, the point of intersection Q can be located at a vertical level that is below the pivots/pivot axes 8*a*, 8*b* themselves.

For example, good results can be achieved when viewed in a top view the pivot axis 8*a*, 8*b* of each nest section 4*a*', 4*b*' can include an angle φ (i.e. it extends along a respective virtual line that includes an angle φ) in the range of 20-70 degrees with respect to a center line of its elongated carrier element 3', in particular an angle φ in the range of 30-60 degrees.

Similarly, for example, good results can be achieved when viewed in side view the pivot axis 8*a*, 8*b* of each nest section 4*a*', 4*b*' includes (that is, the pivot axis extends along a respective virtual line that includes) an angle ρ1 the range of 1-45 degrees with respect to the afore-mentioned horizontal plane H that is defined by the two parallel carrier elements 3, in particular an angle ρ1 in the range of 2-30 degrees.

Similarly, for example, good results can be achieved when viewed in front view (i.e. in the egg transport direction S) the pivot axis 8*a*, 8*b* of each nest section 4*a*', 4*b*' includes (that is, the pivot axis extends along a respective virtual line that includes) an angle ρ2 the range of 1-45 degrees with respect to the afore-mentioned horizontal plane H that is defined by the two parallel carrier elements 3, in particular an angle ρ in the range of 2-30 degrees.

In this way, a width of each of the egg receiving nests N' can locally vary, depending on the pivot state of the two respective nest sections 4*a*', 4*b*', thereby providing improved egg catching and further reducing chances of bouncing between received eggs E. In particular, according to an aspect of the second embodiment, each pair of nest sections 4*a*', 4*b*' can provide a locally (and transversally) expanded egg receiving nest (at an upper nest part) when they are in their first position with respect to the two carrier elements, wherein the pair of nest sections provides a locally (and transversally, at the upper nest part) contracted egg receiving nest, when they are in a second position with respect to the two carrier elements. In the same way, each pair of nest sections 4*a*', 4*b*' can provide a locally (transversally) contracted egg receiving nest (at an lower nest part) when they are in their first position with respect to the two carrier elements, wherein the pair of nest sections provide a locally (and transversally, at the lower nest part) expanded egg receiving nest, when they are in a second position with respect to the two carrier elements. More particularly, see e.g. FIGS. 5A, 5B, each pair of nest sections 4*a*', 4*b*' contacts each other along at least part of opposite edges of those sections when they are in said first orientation. For example, lower parts of the two nest sections 4*a*', 4*b*' (being located below a vertical level of the respective pivot axes 8*a*, 8*b*) can mechanically contact each other, or alternatively be located close to each other (at a relatively short, initial intermediate distance) when the two nest sections are in their initial pivot orientations with respect to the parallel carriers 3 (being also in their initial, nest closing, states). Besides, upper parts of the two nest sections 4*a*', 4*b*' (being located above a vertical level of the respective pivot axes 8*a*, 8*b*) can be spaced-apart from each (at a relatively large distance) when the two nest sections are in their initial pivot orientations with respect to the parallel carriers 3 (being also in their initial, nest closing, states).

Figure 6B:
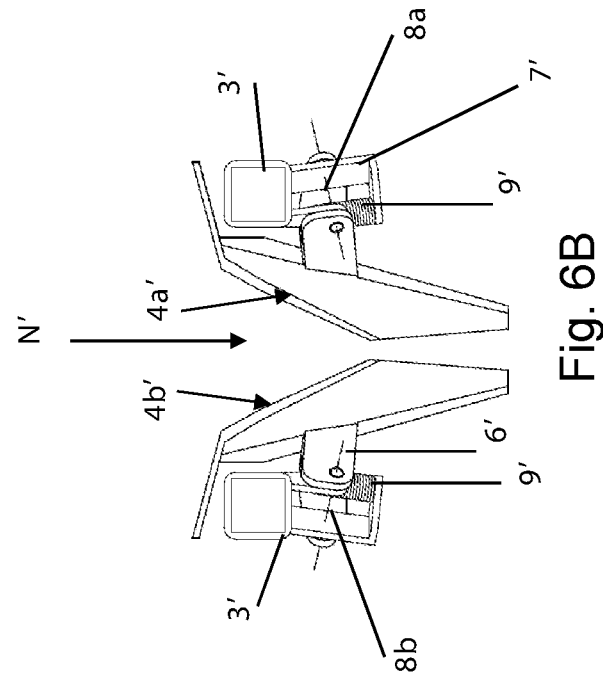
FIGS. 6A, 6B and 6C show a top view, front view and side view of part of the second advantageous embodiment of the egg transfer assembly, when the egg receiving nest is in a second, egg received, orientation.
Figure 6A:
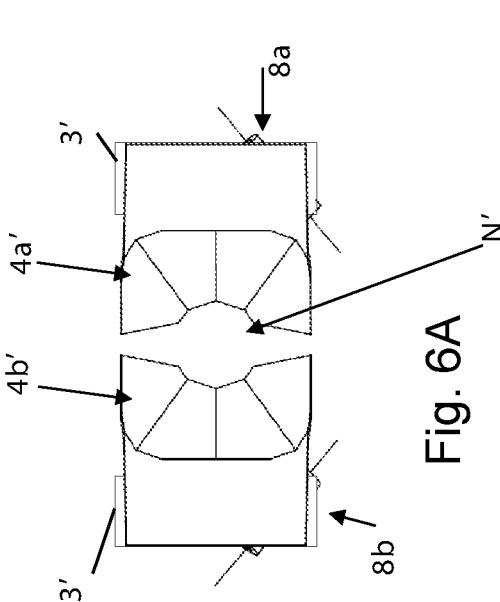
Figure 6C:
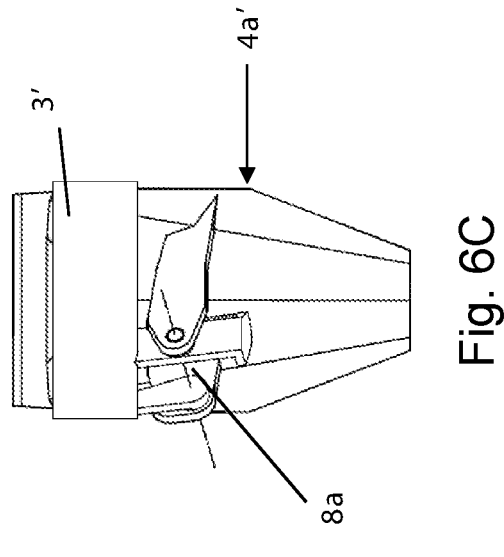

As follows from FIGS. 6A, 6B, in particular due to the orientations of the pivot axes 8*a*, 8*b*, after the nest sections 4*a*', 4*b*' have pivoted to their second orientations with respect to the carriers 3, the lower parts of the nest sections can be spaced-apart (i.e. they do not contact each other anymore), or alternatively be separated further with respect to their initial intermediate distance. Similarly, the upper parts of the two nest sections 4*a*', 4*b*' (i.e. the parts that are located above a vertical level of the respective pivot axes 8*a*, 8*b*) can be moved towards each other with respect to their initial relatively large intermediate distance, after the nest sections have achieved their second positions.

Also, as follows from the drawings, upper edges of the two nest sections 4*a*', 4*b*' can remain near upper sides of the respective carrier elements 3', when they are in each of their first and second orientations. As a result, eggs can be guided better into the nests N, wherein the eggs reach relatively low vertical speeds, so that chances of egg collisions can be significantly reduced (even at relatively high egg supply speeds).

Figure 7:
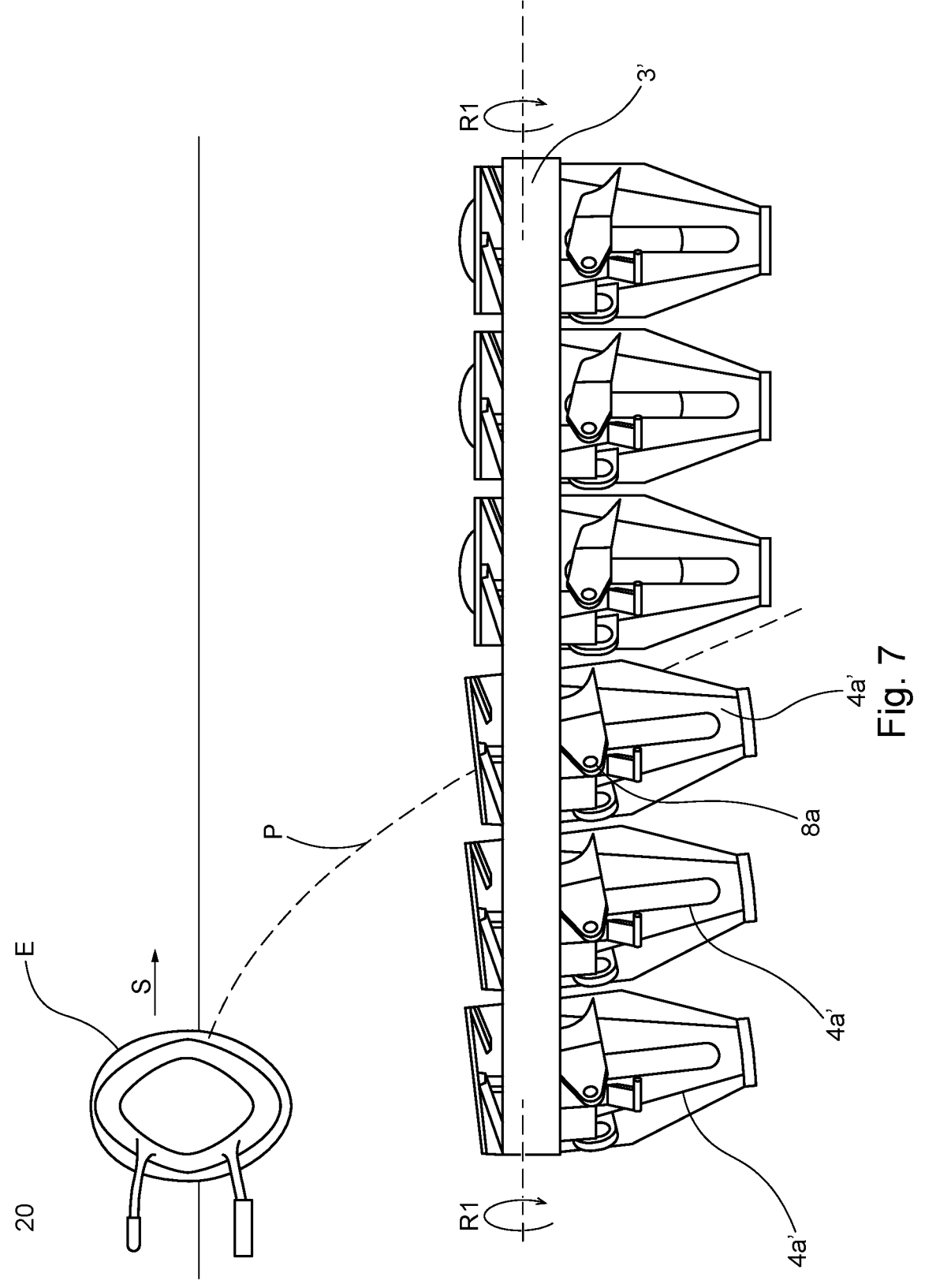
FIG. 7 is a side view of the second advantageous embodiment, during operation, just before an egg is released towards the egg transfer assembly.
Figure 8:
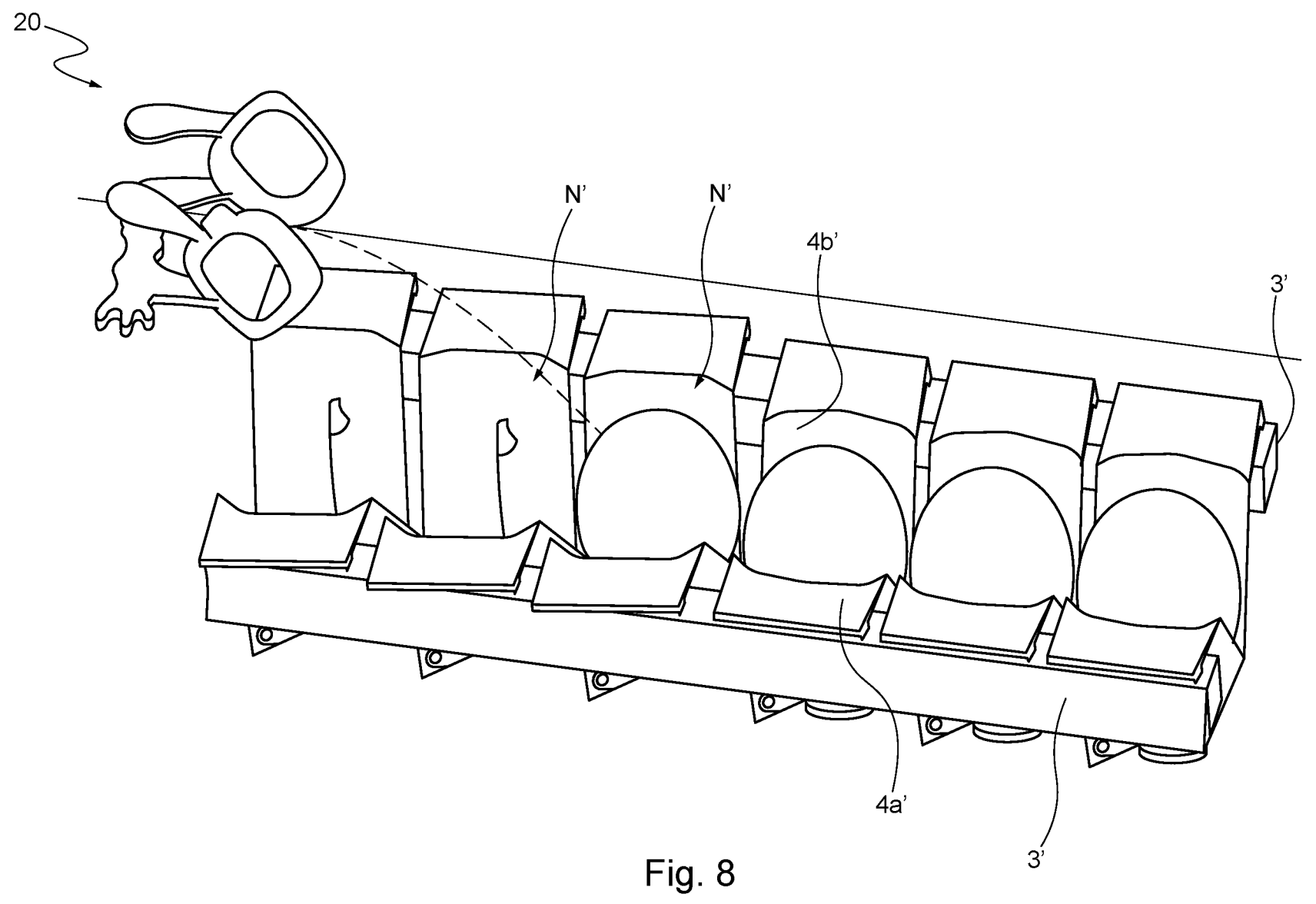

FIGS. 7, 8, which are similar to FIGS. 3, 4, show the second example during operation. The operation of the second embodiment is similar to that of the first embodiment, but provides the additional advantage that each egg receiving nest N' locally (in particular at a top section) contracts transversally during the catching of an egg E, in particular in addition to pivoting from a slanted orientation to a non-slanting or less-slanting orientation (with respect to the two carriers 3). Similarly, a bottom section of the nest N' can slightly expand transversally during the catching of an egg E. In other words, the configuration is such that top parts of each pair of nest sections 4*a*', 4*b*' move towards each other when the nest sections 4*a*', 4*b*' move from their first orientation (i.e. upward position) to the second orientation (i.e. a lowered position), wherein bottom parts of each pair of nest sections 4*a*', 4*b*' preferably move slightly away from each other (without rotating the carrier elements 3 yet) when the nest sections 4*a*', 4*b*' move from the first orientation to the second orientation.

Also, due to the configuration of the second embodiment, the nest sections 4*a*', 4*b*' only require relatively short movements to adjust from their first to their second orientations, so that subsequent nests can be positioned close to each other in the respective nest array. Also, relatively strong spring means 9' can be applied (i.e. to provide proper nest deceleration during egg catching, counteract these short movements, and for returning the nest sections to their first orientations). The structure's susceptibility to contamination/dirt is relatively low, whereas the resulting structure can achieve high reliability, at high system throughput, without damaging the eggs. Besides, due to the orientations of the pivot axes 8*a*, 8*b* (in particular slanted orientations, i.e. at angles relative to both a horizontal plane and a vertical plane), those pivot axes 8*a*, 8*b* are less susceptical to wear, such as wear that can be caused by eggs impacting on the nest sections 4*a*', 4*b*' during egg catching operation.

The skilled person will appreciate that the invention is not limited to the above-described embodiments, within the scope of the present invention as is defined by the claims.

For example, each of said connector structures 6', 7' can be configured in various ways, e.g. having U- or L-shaped or differently shaped coupling arms that are pivotally joined by the pivot axes 8*a*, 8*b*. Afore-mentioned spring means 9' can be mounted or carried by or between these connector structures 6', 7', or integrated therewith, in various ways, as will be clear to the skilled person.

Further, for example, said first connector structures 6, 6' (or coupling sections) can be made in one piece with the respective nest sections, 4*a*, 4*b*, 4*a*', 4*b*' or be joined therewith, e.g. via welding or differently. Besides, the first connector structures can e.g. be located at or near a vertical middle section of the respective nest section but that is not required.

Further, for example, said second connector structures 7, 7' (or coupling sections) can be made in one piece with the respective carrier elements 3, 3' or be joined therewith, e.g. via welding or differently. Besides, the second connector structures 7, 7' can e.g. be located or extend from various sides of a respective carrier element, for example from a bottom or lower side, or differently.

According to an embodiment, the eggs E that are to be processed are non-living, dead, unfertilized, poultry eggs.

Also, for example, each of the carrier elements 3, 3' can include a planar, horizontal upper support surface, for example for supporting optional support members 11 of respective nest sections 4a, 4b when they are in their second positions, but that is not required.

The invention claimed is:

1. An egg transfer assembly comprising two elongated parallel carrier elements, the two carrier elements having arrays of nest sections, pairs of opposite nest sections defining egg receiving nests therebetween, wherein the carrier elements are rotatable in opposite directions for opening and closing the egg receiving nests defined by the pairs of nest sections, characterized in that each nest section is swivably connected to the respective rotatable carrier element, wherein the egg transfer assembly includes pivot axes for swivably connecting the nest sections to the respective rotatable carrier elements.

2. The egg transfer assembly according to claim 1, wherein the two elongated parallel carrier elements are configured to be pivotally held by or coupled to a respective frame of a transfer system, wherein the carrier elements are interconnected by an actuating mechanism for jointly rotating the elements-in opposite directions in order to simultaneously open and close the egg receiving nests, wherein in particular axes of rotation of the carrier elements do not coincide with the pivot axes of the nest sections.

3. The egg transfer assembly according to claim 1, wherein each pair of nest sections is movable, with respect to the two elongated parallel carrier elements, from a first orientation for receiving an egg, falling towards that pair of nest sections, to a second orientation for carrying a received egg in the respective egg receiving nest, the first orientation being a slanted orientation with respect to a vertical plane and the second orientation being in parallel with respect to the vertical plane or being a less slanted orientation than the first orientation.

4. The egg transfer assembly according to claim 1, wherein each pair of nest sections provides an at least locally contracted egg receiving nest and wherein each pair of nest sections provides an at least locally expanded egg receiving nest.

5. The egg transfer assembly according to claim 1, wherein top parts of each pair of nest sections move towards each other when the nest sections move from a first orientation to a second orientation with respect to the two carrier elements, wherein bottom parts of each pair of nest sections preferably move away from each other when the nest sections move from the first orientation to the second orientation with respect to the two carrier elements.

6. The egg transfer assembly according to claim 1, further comprising spring means for counteracting movement of the nest sections with respect to the two carrier elements.

7. The egg transfer assembly according to claim 1, wherein each said pivot axis, connecting a nest section to a respective rotatable carrier element, extends in parallel with respect to a horizontal plane, the horizontal plane being defined by center lines of the two carrier elements.

8. The egg transfer assembly according to claim 1, wherein each said pivot axis, connecting a nest section to a respective rotatable carrier element, extends along a respective virtual line that intersects a horizontal plane, the horizontal plane being defined by center lines of the two carrier elements.

9. The egg transfer assembly according to claim 8, wherein when viewed in a top view the two pivot axes of each pair of nest sections extend along virtual lines that intersect each other.

10. The egg transfer assembly according to claim 8, wherein when viewed in a top view the pivot axis of each nest section includes an angle in the range of 20-70 degrees with respect to a center line of its elongated carrier element, in particular an angle in the range of 30-60 degrees.

11. The egg transfer assembly according to claim 8, wherein the pivot axis of each nest section includes an angle in the range of 1-45 degrees with respect to a horizontal plane, in particular an angle in the range of 2-30 degrees.

12. The egg transfer assembly according to claim 8, wherein the nest sections are connected to the carrier elements via non-horizontal pivot axes.

13. The egg transfer assembly according to claim 8, wherein each pivot axis, connecting a nest section to a respective rotatable carrier element, is slanted with respect to both a horizontal and a vertical plane.

14. The egg transfer assembly according to claim 1, wherein each nest section has a concave inner side and an outer side, and a first connector structure protruding outwardly from said outer side for swivably connecting the nest section to a second connector structure of a respective elongated carrier element, each first connector structure and respective second connector structure in particular being connected by a respective pivot axis.

15. The egg transfer assembly according to claim 1, wherein the pivot axes of the nest sections are located at a vertical level below center lines of the respective rotatable carrier elements.

16. The egg transfer assembly according to claim 1, wherein the assembly is configured such that a swivel movement of each pair of nest sections with respect to the two respective carrier elements, during the receiving of an egg, is gravity effected and egg kinetic energy effected.

17. An egg transfer system further comprising at least one row of egg transfer assemblies according to claim 1.

18. The egg transfer system according to claim 17, further comprising a support structure, for supporting the at least one row of egg transfer assemblies.

19. An egg processing system, comprising at least one egg supply conveyor for supplying eggs along a transport direction, as well as at least one egg transfer system according to claim 17 for receiving eggs from the egg supply conveyor, wherein the elongated parallel carrier elements of the egg transfer system extend substantially in parallel with respect of the transport direction of the egg supply conveyor.

* * * * *